Dec. 29, 1964
J. T. VALESKY
3,163,462
TRAILER SIDE CONSTRUCTION
Filed Nov. 14, 1962
2 Sheets-Sheet 1
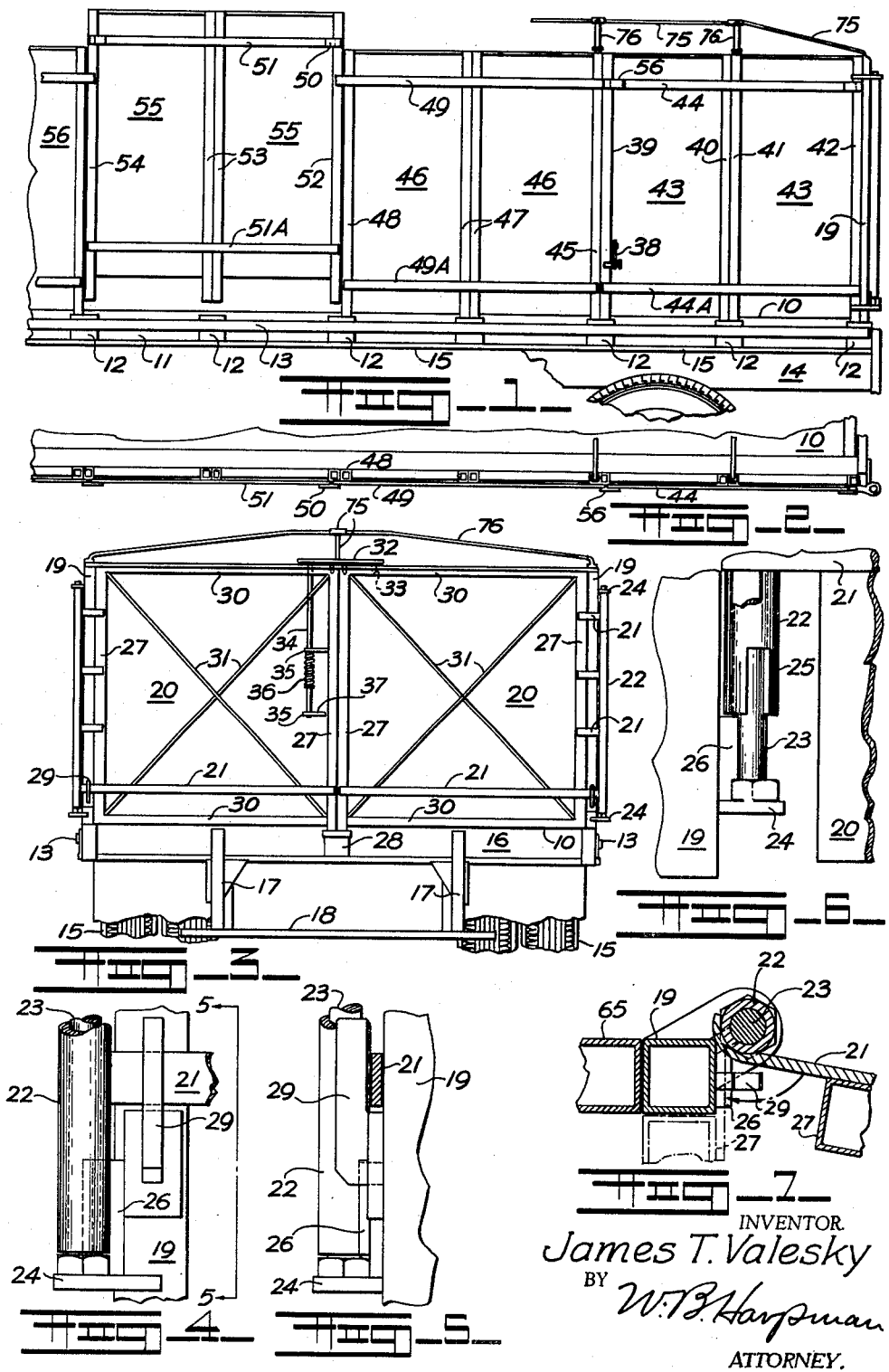
INVENTOR.
James T. Valesky
BY
W. B. Hartman
ATTORNEY.

Dec. 29, 1964   J. T. VALESKY   3,163,462
TRAILER SIDE CONSTRUCTION
Filed Nov. 14, 1962   2 Sheets-Sheet 2
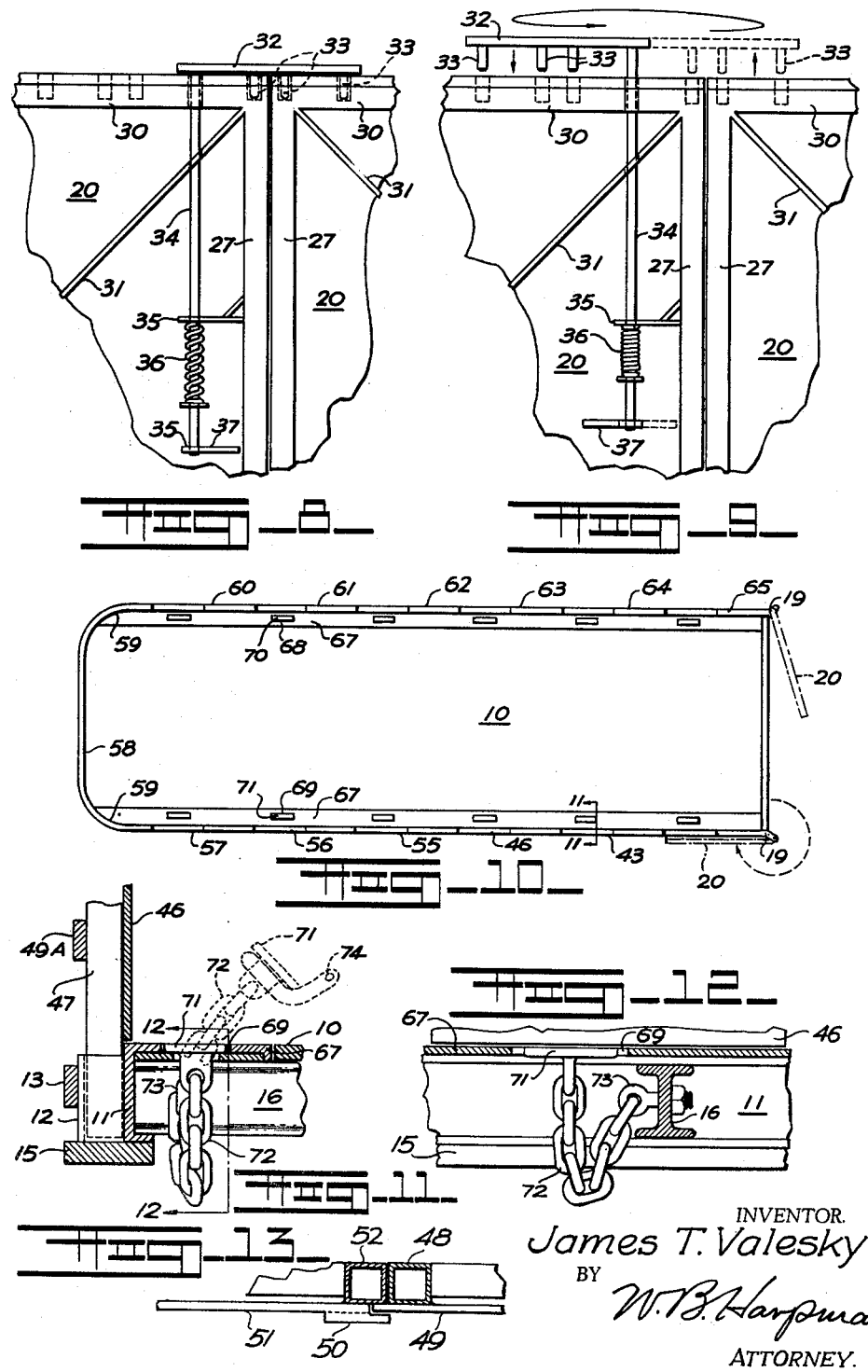
INVENTOR.
James T. Valesky
BY
W. B. Harpman
ATTORNEY.

United States Patent Office 3,163,462
Patented Dec. 29, 1964

3,163,462
TRAILER SIDE CONSTRUCTION
James T. Valesky, 1759 West Ave. NW., Warren, Ohio
Filed Nov. 14, 1962, Ser. No. 237,554
7 Claims. (Cl. 296—28)

This invention relates to a semi-trailer such as used in highway hauling and more specifically to an improved construction for removable side sections, called racks for freight vehicles.

The principal object of the invention is the provision of an improved rack construction incorporating removable interlocking racks.

A further object of the invention is the provision of an improved trailer construction having a stationary front wall and movable doors comprising a rear wall and a plurality of removable racks positioned on either side of said trailer intermediate said front and rear walls.

A further object of the invention is the provision of a trailer construction wherein the sides are formed of a plurality of panels comprising tubular metal frame members and integral sheet metal sections arranged for interlocking relation at their edges and for detachable engagement at their lower ends with means in the trailer deck.

A still further object of the invention is the provision of a trailer construction incorporating stationary supporting structures on the rear corners of the trailer, rear doors hinged thereto and arranged for vertical movement relative to said structure.

A still further object of the invention is the provision of a trailer construction including load securing members movable into and out of openings in the deck of said trailer and to which load binding means may be attached when said members are in extended relation to said trailer deck.

A still further object of the invention is the provision of an improved trailer of economical construction, unusual durability and long life.

The trailer construction disclosed herein comprises an improvement in highway trailers of the flat bed type, which trailers are normally pulled by tractors and generally used in highway freight hauling. Heretofore, such trailers have comprised the usual flat bed trailer with racks as sides and means for applying a tarpaulin top or cover. The racks heretofore used have been notoriously short lived and lacked any provision for interlocking relation with the result that they were frequently damaged and more often improperly installed and therefore incapable of properly holding a load of freight on the flat bed trailer. The present invention provides a flat bed trailer with a fixed metal front end portion and a fixed metal rear door end section and a plurality of interengaging removable metal racks mounted longitudinally therebetween along each side of the trailer deck and which racks have depending means engaging sockets on the trailer deck edges and have interlocking means thereon providing an unusually rigid and durable side wall construction. Many of the racks may be removed individually or collectively for convenient access to the trailer or they may be left in place as desired, and they are arranged to hold a tarpaulin supporting structure so that the trailer may be covered and freight therein protected from the weather. The construction includes novel means for securing a load to the trailer deck and novel means of mounting and securing the doors at the rear end of the trailer, but more particularly relates to the removable interlocking metal rack construction in combination therewith.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side elevation with parts broken away of a portion of a trailer showing one rack thereon partially removed.

FIGURE 2 is a top plan view of the portion of the trailer shown in FIGURE 1.

FIGURE 3 is a rear elevation of the trailer.

FIGURE 4 is an enlarged detail with parts broken away and parts in cross section illustrating a portion of the rear door hinge construction shown in FIGURE 3.

FIGURE 5 is an enlarged cross sectional detail taken on line 5—5 of FIGURE 4.

FIGURE 6 is an enlarged detail with parts broken away and parts in cross section showing an alternate position of the hinge construction detailed in FIGURES 4 and 5.

FIGURE 7 is a horizontal section of the hinge construction shown in FIGURE 6.

FIGURE 8 is an enlarged detailed view of a portion of the rear doors of the trailer shown in FIGURE 3 and showing a latch in latched position.

FIGURE 9 is an enlarged detailed view of a portion of the rear doors of the trailer shown in FIGURE 3 and showing a latch in unlatched position.

FIGURE 10 is a top plan view of a trailer formed in accordance with the invention.

FIGURE 11 is an enlarged detail taken on line 11—11 of FIGURE 10.

FIGURE 12 is an enlarged detail with parts broken away and parts in section taken on line 12—12 of FIGURE 11.

FIGURE 13 is an enlarged cross sectional detail showing part of the construction seen in FIGURES 1 and 2.

By referring to the drawings and FIGURES 1, 2, 3 and 10 in particular, it will be seen that a trailer is disclosed which includes a deck 10 having spaced parallel edge frame members 11, 11 and which members 11, 11 have a plurality of open top square metal sockets 12, 12 secured thereto and interconnected by a longitudinally extending metal bar 13. The metal sockets 12, 12 form means for receiving and holding a plurality of racks. The trailer deck 10 has longitudinally extending frame members 14, 14 therebeneath as so known in the art and conventional axle constructions including at least one pair of ground engaging wheels. A longitudinally extending bar 15 extends beneath the metal sockets 12, 12 and is secured to the adjacent edge frame member 11 as best seen in FIGURE 11. The deck 10 has a plurality of transverse frame members 16, 16 one of which is located at the rear edge thereof and supports a pair of spaced depending frame members 17, 17, the lowermost ends of which are interconnected by a transverse member 18 as best seen in FIGURE 3 of the drawings. The rear corners of the deck 10 are provided with fixed vertically standing posts 19, 19 which are cross sectionally square tubular members. The posts 19, 19 are attached to the rearmost vertical edges of the last two racks on the sides of the trailer which also are fixed to the trailer so as to form rigid corner constructions. Doors 20, 20 are hinged by offset arms 21, 21 to tubular members 22, 22 (see FIGURES 4, 5, 6 and 7) which in turn are rotatably positioned on vertical rods 23, 23 the vertical rods 23, 23 being attached to the posts 19, 19 at their uppermost and lowermost ends by offset brackets 24, 24. The vertical rods 23, 23 are each longer than the tubular members 22, 22 which are rotatably positioned thereon and the tubular members 22, 22 are slotted as at 25, 25 upwardly from their lowermost ends in a position which corresponds with a pair of projecting bosses 26, 26 on the post 19, 19, when the doors 20, 20 are in closed position as shown in FIGURES 3, 4 and 5 of the drawings. It will thus be seen that the doors 20, 20 cannot be opened until they are first moved upwardly whereupon the bottom ends of the tubular members 22, 22 will rest upon and slidably engage the bosses 26, 26 as best seen in FIGURES 6 and 7 of the drawings. It will further be observed that when the doors 20, 20 are in closed position as shown in FIGURES 3, 4 and 5 the lower ends of the two of their vertical frame sections 27, 27 will engage a metal socket 28 on the transverse rear frame member 16 heretofore referred to so that the doors 20, 20 are held in closed position by the means disclosed. Hook members 29, 29 formed on the posts 19, 19 then engage the bars 21, 21 which form part of the door structure. The doors 20, 20 are formed of the tubular metal frames comprising vertical members 27, 27 and top and bottom rails 30, 30 respectively, together with sheet metal sections welded thereto and crossed bracing bars 31, 31. In order that the doors 20, 20 may be securely locked and aligned at their uppermost edges a latching device is disclosed which comprises a latch bar 32 having depending detents 33, 33 thereon and a support arm 34 which is rotatably mounted in a pair of apertured brackets 35, 35 and spring urged downwardly with respect thereto by a spring 36 as best seen in FIGURES 3, 8 and 9 of the drawings. It will be observed by referring thereto and to FIGURE 8 in particular that the doors 20, 20 have openings in their uppermost frame members 30, 30 which register with the detents 33, 33 and thereby cause the latch bar 32 to be located in overlapping interlocking relation securing the upper frame members 30, 30 of the doors 20, 20 to one another and holding the same in longitudinal end to end alignment. In FIGURE 9 of the drawings, it will be observed that the supporting arm 34 has been moved upwardly as by a handle 37 positioned on its lowermost end so that the detents 33, 33 are disengaged from the openings in the frame members 30, 30 and the latch bar 32 swung in a half circle as indicated by the arrow in FIGURE 9 of the drawings to a position where the detents can register with openings in the frame member 30 of the door 20 on which the latch bar is pivoted, and thereby be held in non-latched position. The doors 20, 20 are then lifted upwardly as heretofore described and can be swung open and they will then move to a position shown in dotted lines in FIGURE 10 of the drawings where they may be secured by latches 38 on the fixed side panels of the trailer.

Referring again to FIGURE 1 of the drawings, it will be seen that each fixed rack comprises four vertically positioned cross sectionally square tubular members 39, 40, 41 and 42 respectively secured to a sheet metal section 43 and have a pair of horizontally disposed bars 44, 44 positioned thereacross in spaced relation to the upper and lowermost ends of said members. The member 42 is permanently attached to the adjacent post 19, the members 40 and 41 are secured to each other and the member 39 forms the forward edge of this rearmost fixed rack. It will be observed that the lower ends of the tubular members 39, 40, 41 and 42 are permanently positioned in three of the metal sockets 12, 12 heretofore referred to and that the metal socket 12, which receives the depending end of the tubular member 39, is of the same width as the other metal sockets 12 so that it may also receive the adjacently located cross sectionally square tubular member 45 of the adjacent rack which includes a sheet metal section 46, a central pair of tubular members 47 and a front edge tubular member 48. Horizontally disposed bars 49, 49 are secured to the tubular members 45, 47 and 48 with an end portion of the uppermost one of said horizontal members 49 extending outwardly beyond the tubular member 48 and offset as indicated by the numeral 50. Thus, the next forward rack which is shown in FIGURE 1 as being elevated slightly and sufficiently to disengage the lower ends of its framework from the metal sockets 12, 12 will be positioned when lowered into engagement with the same with an end of a bar 51 lying beneath the offset end 50 and thereby held in horizontal alignment therewith. The rack including the horizontal bar 51 includes a secondary horizontal bar 51A and vertical frame work including a cross sectionally square tubular member 52, a pair of the same as indicated at 53 located in the middle of the rack and a front edge member 54 all of which are secured to a sheet metal section 55 which is the same size as the sheet metal sections 46 and 43 heretofore referred to.

Still referring to FIGURE 1, it will be observed that the rearmost rack which is fixed and which includes the sheet metal section 43 has an offset forwardly extending end 56 formed on the bar 44 and arranged to overlie the adjacent end of the horizontal bar 49 as best seen in FIGURES 1 and 2 of the drawings. Those skilled in the art will understand that racks including sheet metal sections are continued along the sides of the trailer as best seen in FIGURE 10 of the drawings wherein they are generally indicated by the reference numerals applied to the sheet metal sections 43, 46, 55, 56 and 57 respectively. The forward edge of the racks 57 abuts the rear edge of the front wall 58 and more specifically the ends of the curved corner portions 59, 59 thereof.

It will thus be seen that in the embodiment of the invention illustrated five of the six substantially square racks located on each side of the trailer may be readily removed and replaced as desired and that when they are in position they interlock so as to form an unusually rigid self-aligning and durable side on the trailer deck 10. In FIGURE 10 of the drawings, the opposite side of the trailer will be seen to include a duplicate arrangement including racks 60, 61, 62, 63 and 64 which are removable in exactly the same manner as their oppositely disposed equivalent racks 57, 56, 55, 46 and 43 and a rearmost fixed rack 65 which abuts the rearmost post 19 on that side of the trailer.

Still referring to FIGURE 10 of the drawings, it will be observed that inwardly of the plurality of removable racks just described the trailer deck edge construction includes the longitudinal edge frame members 11, 11 having inturned flanges 67, 67 respectively as also seen in FIGURES 11 and 12 of the drawings, which flanges 67, 67 incorporate a plurality of openings 68 and 69 respectively in which a plurality of T-shaped members 70 and 71 are located each of which has an aperture in the vertical portion thereof to which a link in a chain 72 is secured, the other end of the chain 72 being secured to an eye-bolt 73 affixed to one of the transverse frame members 16 heretofore referred to. In FIGURE 11, broken lines show one of the T-shaped members 71 moved upwardly out of its opening 69 to the extent permitted by the chain 72 so that a load binding member such as a cable, chain, or steel strap 74 may be wrapped about the vertical portion of the member 71 beneath the horizontal portion thereof to form a suitable anchor for the loading binding member 74.

It will thus be seen that a semi-trailer has been disclosed which incorporates several distinct improvements including primarily the uniquely formed removable racks and their interlocking means by which they engage one another as well as the trailer itself and the unique door construction which provides a comparable hinged panel arrangement on movable hinge constructions as well as the load securing members 71 which become part of the flat bed of the trailer 10 when not in use.

In FIGURES 1 and 3 of the drawings, an overhead metal framework may be seen including a single longitudinal member 75 and a plurality of transverse members 76 the ends of the transverse members 76 being downturned and provided with enlargements which are engageable in the upper ends of the tubular members forming the vertical framework of the plurality of racks which in turn form the sides of the semi-trailer. It will occur to those skilled in the art that a tarpaulin may be positioned over the members 75 and 76 to form a weather-tight closure relative to the semi-trailer and that before the various removable racks may be removed the superstructure including the members 75 and 76 is removed and the same is therefore formed in a plurality of sections as will be understood by those skilled in the art.

It will thus be seen that the trailer construction disclosed herein meets the several objects of the invention, and having thus described my invention, what I claim is:

1. A trailer construction comprising a flatbed and wheel and axle means for supporting the same relative to a highway, said flatbed including edge frame members having a plurality of metal sockets positioned thereon in longitudinally spaced relation and a plurality of removable racks having socket engaging legs normally standing vertically therein, each of said racks comprising at least two vertical frame members the lower ends of which form said legs, a sheet metal section affixed thereto and on one side thereof above the lower ends thereof and a pair of vertically spaced horizontally disposed bars secured to said vertical frame members on the opposite side thereof with respect to said sheet metal section, at least one of each pair of said horizontal bars having a projecting horizontally offset end portion overlying the end of a horizontal bar on the adjacent rack.

2. The trailer construction set forth in claim 1 and wherein each of said racks has a pair of vertical frame members centrally thereof and including depending lower ends forming a leg engageable in one of said metal sockets.

3. The trailer construction set forth in claim 1 and wherein the vertical positioned frame members are formed of cross sectionally square steel tubing and the metal sockets are of a size and shape defining a rectangular opening snugly fitting a pair of said secondary square frame members.

4. The trailer construction set forth in claim 1 and wherein the rearmost rack on each side of said trailer is permanently affixed thereto, a vertical post secured to the rearmost edge of each of said rearmost racks, a pair of doors hingedly affixed to said posts by vertically movable hinge constructions, said doors including vertical frame members on their free edges, a metal socket on said trailer deck edge, said vertical frame members normally positioned in said metal socket when said doors are in closed relation.

5. The trailer construction set forth in claim 1 and wherein a permanent vertically standing front wall is secured to said trailer flatbed, said front wall having rearwardly extending end portions abutting the forward edges of the forward pair of said removable racks.

6. The trailer construction set forth in claim 1 and wherein a permanent vertically standing front wall is secured to said trailer flatbed, said front wall having rearwardly extending end portions abutting the forward edges of the forward pair of said removable racks, a corner post secured to the rear edge of each of the rearmost pair of said racks, said rearmost pair of racks affixed to said deck, doors hinged to said corner posts for normally forming a rear wall on said trailer flat bed, hinge constructions incorporating vertically movable sections, said doors including vertical frame members on their free edges having depending end portions and a metal socket on the rear edge of said trailer flatbed for normally receiving said depending end portions of said frame members of said doors.

7. A rear door construction for a semi-trailer having a flatbed, corner posts on the rear corners of said flatbed, offset brackets on said corner posts mounting vertical hinge pins, tubular hinge members rotatably positioned on said hinge pins, arms secured to said tubular hinge members and to said doors, said doors including vertical frame members on their free edges having depending leg portions, a metal socket on the rear edge of said flatbed for normally receiving said depending leg portions of said vertical frame members, said tubular hinge members being relatively shorter than said hinge pins to permit vertical movement relative thereto and said tubular members having upwardly extending slots in their lowermost ends, vertically standing bosses on said posts adjacent the lowermost ends of said hinge pins and registerable with said slots when said doors are in normally closed position and acting to engage the bottom ends of said tubular hinge members so as to hold the same in elevated relation when said doors are opened, said doors having openings in their uppermost edges and a latch bar pivoted to one of said doors, detents on said latch bar normally engaging said openings in said upper edges of said doors when said doors are in closed position.

References Cited in the file of this patent

UNITED STATES PATENTS

| | | |
|---|---|---|
| 849,023 | Sargent | Apr. 2, 1907 |
| 931,710 | Boyd | Aug. 17, 1909 |
| 1,280,210 | Golding | Oct. 1, 1918 |
| 1,805,851 | Seitz | May 19, 1931 |
| 1,893,532 | Ball | Jan. 10, 1933 |
| 1,934,165 | Butterworth | Nov. 7, 1933 |
| 2,312,119 | Nystrom et al. | Feb. 23, 1943 |
| 2,756,693 | Frost | July 31, 1956 |
| 3,007,422 | Brotton | Nov. 7, 1961 |
| 3,010,755 | Black | Nov. 28, 1961 |
| 3,070,400 | Rivers | Dec. 25, 1962 |

OTHER REFERENCES

Article, "Side Racks Convert Flatbed to Open Top," in "Commercial Car Journal," June 1956, page 106.